Feb. 6, 1940.                    C. A. HEILAND                  2,189,377
                METHOD AND APPARATUS FOR ELECTRICAL PROSPECTING
                            Filed Feb. 23, 1937
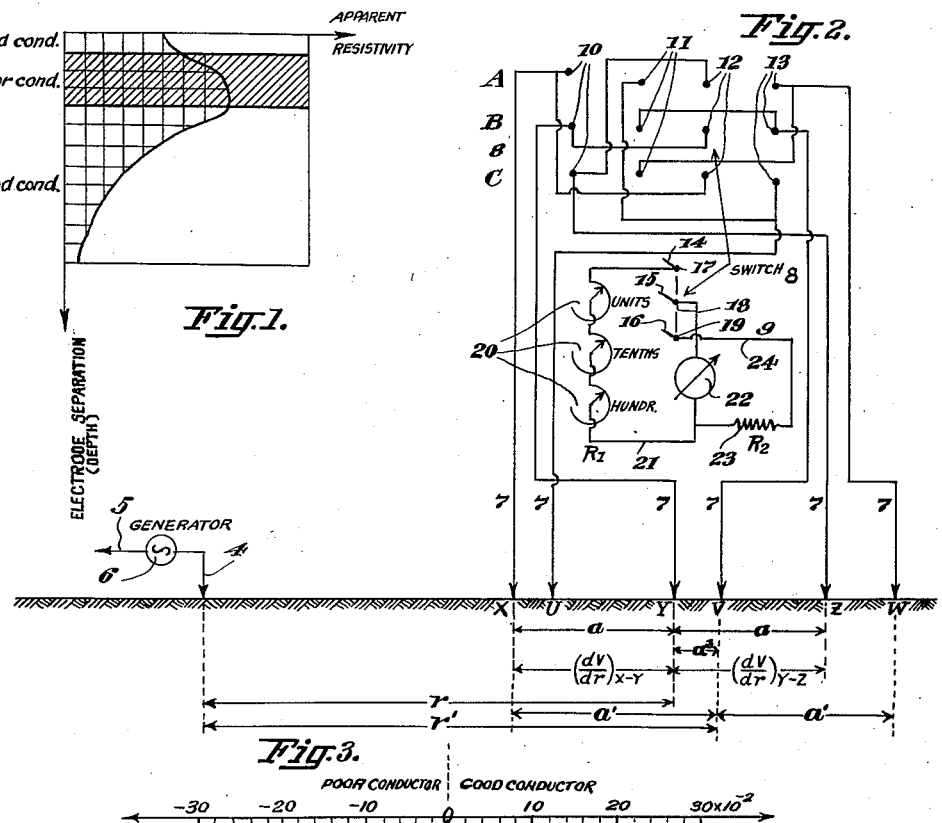
Inventor
CARL A. HEILAND Patented Feb. 6, 1940

2,189,377

UNITED STATES PATENT OFFICE 2,189,377

METHOD AND APPARATUS FOR ELECTRICAL PROSPECTING

Carl A. Heiland, Denver, Colo., assignor to Heiland Research Corporation, Denver, Colo., a corporation of Colorado Application February 23, 1937, Serial No. 127,227

5 Claims. (Cl. 175—182)

The present invention relates to electrical prospecting, and more particularly to electrical prospecting by the "potential method."

In general, this method of prospecting comprises creating an electric field in the earth in or near the area to be investigated, and in measuring the difference in potential between spaced points in the area. It is well-known that different formations in the earth have different conductivities, and that changes of formation encountered as the distance from the surface of the earth increases, can for this reason be detected at the surface by measuring differences in potential between spaced points, the potentials having been set up by the field established as above mentioned. It is also known that the depth at which changes of conductivity occur is approximately equal to the distance in a series of points on the surface, between the first point and the point where a change in the gradient of potentials occurs. In other words, where a potential gradient is established by measuring the difference in potential between a series of points, a change in the gradient at any point indicates a change in conductivity in the earth formation at a depth approximately equal to the distance of the point of change in gradient from the first point used in establishing the gradient.

Heretofore geological explorations have been carried out by measuring potentials at points spaced from each other and from the field-creating devices. In one of these methods, the resistivity of the earth structures is calculated from the potentials at the respective points. However, inasmuch as the formations of different conductivities make themselves apparent beyond their actual physical limits, the resistivities that are calculated are apparent resistivities and are a very complex function of the actual resistivities of the formation members and the depth of penetration. Thus, while theoretically the spacing between the points at which potentials are measured is equal to the depth of the changes of conductivity, actually, very complicated calculation must be made to ascertain the depths. Furthermore, as will be later explained more fully in connection with the drawing, the curve plotted from these calculations will not show sharp breaks at points corresponding to the surfaces of the members, but, due to the abovementioned tendency of the apparent resistivity of a body to extend beyond its physical dimensions, the apparent resistivities of adjacent bodies overlap, and result in a gradual curve.

A simpler method of determining the depth at which conductivity changes occur makes use of a derivative of the potentials, rather than of the potentials themselves. Where potential gradients (by which is meant the rate of change in potential as the distance increases) are determined, the gradients are found to have a more accurate relation to depth of formation boundaries than do potentials alone. The simplest manner of determining such gradients would be to move a pair of fixedly spaced pickup devices, such as electrodes, to gradually increase the distance from the field-creating means, and establish a curve from the difference in potential encountered at the different positions.

A further refinement is to compare two potential gradients established respectively between adjacent points, as by using three potential electrodes and measuring first the difference in potential between the first and second, and then the difference between the second and third, and forming their ratio. Advantageously these ratios of gradients are compared simultaneously by means of a bridge arrangement.

The present invention is an advance over the last described method. In this method a derivative of the potentials still higher than the ratio of the gradients is measured. This results in an increased interpretability of the results. By means of the apparatus to be described, and forming a part of the invention, a very accurate relation of depth to horizontal distance is obtained, and by arranging the apparatus in accordance with certain relationships, the results may be obtained directly from dial readings without calculations.

One object of the present invention is to provide a novel method of potential exploration, by means of which the depth of the surfaces of the geological bodies can be accurately determined without calculation.

Another object is to provide apparatus comprising a novel arrangement of instruments, by means of which the depth of the formations may be determined without calculation from dial readings.

Still another object is to provide a novel combination of instruments, by means of which necessity for the determination of phase shift is avoided.

The method that is used comprises, in effect, measuring the respective differences in potential existing between two spaced points and an intermediate third point, establishing from these measurements a gradient or rate of change in potential with respect to the distance between points, repeating the operation with a second set of points spaced from the first set, establishing ratios between the gradients resulting from the two sets of potential measurements, and establishing a gradient of the ratios so obtained. The ratios between the potential gradients first obtained vary with the distance, and the final gradient results from the variations of ratios as the distance increases.

By means of the arrangement of the apparatus, which arrangement includes a definite system of spacings between the field-creating means and the pickup devices, and a bridge circuit containing resistors of values selected with respect to each other and in relation to the spacing system, the ratios may be established without calculation from dial readings, and plotted as a horizontal gradient.

In the accompanying drawing:

Figure 1 is a diagrammatic illustration of a section of the earth, near its surface, with the curve resulting from a test by the resistivity method superposed thereon to show the relation.

Figure 2 is a diagrammatic illustration of the apparatus forming a part of this invention.

Figure 3 is a curve resulting from a test by the method and apparatus of this invention of the same area as that illustrated in Figure 1.

The system makes use of an electric field created between two grounded power electrodes 4 and 5. It is well known that in electrical prospecting, the depth of penetration is related to the frequency of the current, the depth decreasing with increasing frequency. By using a current of low frequency, instead of high frequency, as has heretofore been proposed in connection with other systems, not only is the depth to which exploration can be extended increased, but the necessity of using alternating current bridges, i. e., bridges for measuring impedance instead of resistances, is obviated. A low frequency alternating current generator 6 also avoids battery and commutator systems that are not advantageous in field work.

The poles of the generator are connected to the electrodes 4 and 5, the latter being grounded at rather widely spaced points, and an electric field is set up by the alternating current flowing between them.

The measuring system comprises a plurality of electrodes connected through a switching arrangement to a bridge circuit. Inasmuch as the field current is very low in frequency, the indicating instrument may be a glow tube or an alternating current galvanometer of high sensitivity, such as a low frequency oscillograph or vibration galvanometer.

So that gradient of the ratios between gradients of potential drop existing between spaced points may be established, two sets of spaced potential electrodes 7 are used. The electrodes of one set are designated X, Y and Z, and those of the other U, V and W. The electrodes of one set alternate with those of the other, and the electrodes of each set are equally spaced with respect to one another.

The necessary accuracy of relationship of depth to horizontal spacing is obtained by the relationship of the spacing between the electrodes in each set to the spacing of the central electrode of the set from the nearest power electrode 4. Theory shows that the desired accuracy between horizontal distance and depth is obtained when the spacing between the central potential electrode, X or Y, and the nearest power electrode 4 is an even multiple of the spacing between the electrodes of that particular set.

In Figure 2, the spacing between the electrodes X, Y, Z is represented by the line $a$, and that between the nearer power electrode 4 and the central electrode Y by the line $r$. The spacing between electrodes U, V, W is shown by the lines $a'$ and the spacing of electrodes V and 4 by the line $r'$.

From the above, it will be seen that the spacing of the electrodes is in accordance with the equations.

$$r = ma$$
$$r' = ma'$$

where $m$ is any integer. For practical reasons in connection with the bridge resistances, to be later described, a suitable value for the letter $m$ is three.

The spacing shown by line $a_3$ between the central electrodes Y and V of the respective sets, is determined by the units to be used in plotting the curve. Thus, it may be one foot, three feet, or any other desired unit of measurement.

The electrodes are connected to a switching arrangement 8 and a bridging arrangement 9 that are so arranged as to give the desired quantities, namely, the ratios between the gradients of potential drop, as dial readings, ready for plotting as components of a curve representing the gradient of the ratios in question.

The switching arrangement 8 is a three pole, quadruple throw switch, having four sets of fixed contacts 10, 11, 12, and 13, and movable contacts 14, 15 and 16 connected respectively to fixed terminals 17, 18 and 19. The fixed contacts of each of the sets are designated respectively A, B, and C, and it will be seen that the movable contact 14 connects the contacts A with the terminal 17, movable contact 15 connects the contacts B with terminal 18, and movable contact 16 connects contacts C with terminal 19.

The electrodes 7 are connected with the fixed contacts as follows:

| Electrode | Contacts |
|---|---|
| X | 10A and 12C |
| Y | 10B and 12B |
| Z | 10C and 12A |
| U | 11A and 13C |
| V | 11B and 13B |
| W | 11C and 13A |

The switch 8 is arranged so that the movable contacts 14, 15 and 16 are thrown together into contact with their cooperating fixed contacts in sets 10, 11, 12 and 13, successively.

The bridge is arranged as follows:

A decade box comprising a series of variable resistances 20 of fixed variation is connected in a circuit 21 with the terminal 17 of the switch 8 and one terminal of the indicating instrument 22 of the bridge 9. A fixed resistance 22 is connected in a circuit 24 with the fixed terminal 19 of the switch 8 and the same terminal of the instrument 22. The opposite terminal of the instrument 22 is connected to the fixed terminal 18 of the switch. The variable resistances 20 are provided with suitably calibrated dials, which may be read when the bridge is balanced as indicated by the instrument 22.

When the switch is thrown into contact with the set of contacts 10, the current from the electrode X is led through circuit 21 and the decade box to the instrument 22, that from electrode Y is led to the opposite terminal of the instrument, while the current from electrode Z is led through circuit 24 and the fixed resistor 23 to the common terminal of the instrument. When the switch is thrown to contact set 11, the electrodes U, V and W are substituted for electrodes X, Y and Z, respectively. When contacts 12 are engaged by the switch the electrodes X and Y are transposed so as to reverse their positions with relation to the bridge. Position 13 of the switch results in a similar transposition of electrodes V and W. These transpositions are for check reading purposes, the readings of the two positions for each set of electrodes being averaged for the ultimate figure to be used as a curve component.

As stated above, the system is arranged to give the desired results as dial readings to avoid calculations. This is done by selection of the value of the resistances of the bridge 9.

In the following equations the resistance of the variable resistances 20 is designated R, and that of the fixed resistance 23, as $R_2$.

The equation for determination of the resistances is as follows:

$$\frac{\left(\frac{dV}{dr}\right)(X-Y)}{\left(\frac{dV}{dr}\right)(Y-Z)}=\frac{R}{R_2}$$

in which $dV$ is the difference in potential or voltage drops, $$\frac{dV}{dr}$$

is the potential gradient, and the letters (X—Y) and (Y—Z) indicate the electrodes being measured. Therefore the meaning of the equation is that the ratio between potential gradients of electrodes X—Y and Y—Z respectively, is equal to the ratio between the resistances in the two sides of the bridge.

Similarly $$\frac{\left(\frac{dV}{dr'}\right)(U-V)}{\left(\frac{dV}{dr'}\right)(V-W)}=\frac{R}{R_2}$$

Then in order to obtain the ratios of the gradients of potential drop as direct dial readings, the resistors in circuit must be so arranged that $$R=nR_2$$

in which $n$ is a resistance factor.

The most practical arrangement would appear to be to make the variable resistors equal to the fixed resistor $R_2$, but inasmuch as it is desirable to obtain from the instrument the depth of formation boundaries without calculation, the horizontal distance at which a change in sign of the gradient of the potential gradient ratios is obtained, as indicated by the direction of deflection of the instrument 22, should be equal to the depth at which a change in resistivity occurs. As before explained, the relation can be obtained when distance $r$ is a multiple of distance $a$ or $$r=ma$$

Furthermore, in order to most suitably arrange the bridge, it is important to know what the "normal" ratio of potential gradients would be, that is, what the ratio would be if there were no change of resistivity due to changes of formation. Theory shows in this connection that the equation representing normal ratio is—

$$\frac{\left(\frac{dV}{dr}\right)(X-Y)}{\left(\frac{dV}{dr}\right)(Y-Z)}=\frac{m+1}{m-1}$$

where $m$ has the same significance as before. Thus if $m$ is equal to two, the normal ratio of potential gradients between electrodes X—Y and electrodes Y—Z is three, or, if $m$ is equal to three, the normal ratio is two.

Obviously it is advantageous to have normal or homogeneous ground indicated by a unitary gradient ratio. Therefore the resistor 23 should bear such relation to the resistors 20 that the reduction of the ratio of potential gradients for homogeneous ground to one is automatically executed. Consequently it becomes advantageous to adapt the resistor factor $n$ to the electrode spacing expressed by the factor $m$ that has been assigned an arbitrary integer as a value. This may be accomplished by rendering the factor $n$ equal to the reciprocal of the ratio of potential gradients for normal ground, as expressed by the equation—

$$n=\frac{m-1}{m+1}$$

In the field application of this method, as before stated, electrode arrangements in the relation $$r=3a$$

have proved quite satisfactory, since with this spacing the normal ratio of potential gradients is two, and the field manipulation and construction of the apparatus are particularly simple.

Following out the equations where $m$ is given a value of three $$R=mR_2$$

$$n=\frac{m-1}{m+1}$$

and $$m=3$$

then $$n=\frac{3-1}{3+1}=\frac{1}{2}$$

$$R=\frac{1}{2}R_2$$

$$2R=R_2$$

Therefore the resistance of the variable resistors 20 should equal one-half of the resistance of the fixed resistor 23 in order to give direct readings on the calibrated adjusting dials of the variable resistors and automatically reduce the ratio of potential gradients for normal ground to one.

The procedure in making a prospecting test is as follows. The apparatus being arranged with the electrodes spaced as above described and shown in Figure 2, the generator is started and the switch 8 is thrown to the position to engage contact set 10, thereupon the instrument 22 will vibrate with the generator frequency. The bridge is balanced by means of the variable resistances 20, which condition is indicated by a zero reading or steady condition of the instrument 22. Where a mirror galvanometer is used, an unbalanced condition of the bridge is indicated by a band of light, while a balanced condition results in a spot of light. The readings of the calibrated dials carried by the variable resistances are noted. The switch is then thrown to engage the set of contacts 11, this bringing electrodes U, V and W into circuit with the bridge. The sign of the reading is noted as before, and the same procedure of balancing is followed and the dial readings noted, thereupon the switch is thrown to the contact set 12, which results in a reversal of the arrangement of the electrodes X, Y and Z with respect to the bridge. Upon balancing the bridge circuit, the dial readings give the reciprocal of the first readings. After these are determined, the switch is thrown to the set 13, which results in reciprocal readings of the electrodes U, V and W. The reciprocals of X, Y and Z and U, V and W are then averaged to get the final figures from which the curve is plotted.

The curve may be plotted as a horizontal gradient, the units of spacing of the readings being determined by the spacing $a_3$ between the electrodes Y and V. When the curve has been plotted it may be rotated through an angle of 90 degrees, or to a vertical position, and will result in an accurate showing of changes of conductivity caused by formations in the earth.

In Figure 1, a section of the earth is diagrammatically illustrated with a good conducting layer at the surface, a layer of poor conducting material underlying the top layer, and a third layer composed of material of good conductivity. The curve superposed upon the diagram illustrates a curve resulting from an apparent resistivity test. It will be noted that as the boundaries of the poor conductor are approached from either side, the apparent resistivity increases and results in a gradual curve. It is also to be noted that as the depth of penetration increases, the apparent resistivity of the lowermost layer of good conducting material decreases, whereas the actual resistivity of the layer or formation is uniform.

Figure 3 illustrates a curve obtained of the same section of earth as that disclosed in Figure 1 by the method and apparatus of this invention. It will be noted that the curves break sharply, this being due to the use of the higher derivatives of potential rather than either the potentials themselves, the gradients of the potentials or the ratios of the gradients. The curve disclosed in Figure 3 and which was obtained by an actual test, was checked by means of a well existing near the place of test. It was found that at twelve feet, a water level was encountered, this corresponding to the second layer of good conductivity.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim is:

1. In a system for electrical prospecting, including spaced grounded electrodes for creating an electric field in the ground and means for supplying current to the electrodes, a series of three potential pickup electrodes arranged linearly and at equal spaces, the central electrode being spaced from the nearest field creating electrode a distance that is equal to a multiple of the distance between the electrodes, and a bridge connected in circuit with the three electrodes for balancing the current flow between them.

2. In a system for electrical prospecting including spaced grounded electrodes for creating an electric field in the ground and means for supplying current to the electrodes, a series of three potential pickup electrodes arranged linearly and at equal spaces, the central electrode being spaced from the nearest field creating electrode a distance that is equal to a constant multiple of the distance between the pickup electrodes, and a bridge connected in circuit with the three electrodes for balancing the current flow between them, the said bridge having a variable resistance on one side and on the other side a fixed resistance of a value calculated in relation to the resistance of the fixed resistor and the electrode spacing, to give a unitary setting of the variable resistance when the system is applied to homogeneous ground.

3. In a system for electrical prospecting including a pair of spaced grounded power electrodes and means for supplying electricity thereto to set up an electric field in the ground, a series of three potential pickup electrodes in linear relation with, and spaced increasing distances from, one of the power electrodes, a second series of three potential pickup electrodes in linear relation with, and spaced from the electrodes of the first series, the electrodes of each series being equally spaced and the central electrode of each series being spaced from the power electrode with which it is in linear relation a distance that is a multiple of the distance spacing the electrodes of that series, a bridge for balancing the current flow between electrodes of the respective series and including arms of fixed and variable resistances respectively, the resistances of the respective arms being in the same ratio as the reciprocals of the distance between the central electrodes of the respective series, and switching means for connecting the electrodes of the respective series with the bridge.

4. In electrical prospecting by the potential system that includes setting up an electrical field in the ground by means including spaced grounded electrodes and measuring potentials at points in the area to be surveyed, the method of obtaining data for direct plotting in a curve that represents the conductivity of strata in the earth that comprises electrically connecting two respective points on the ground that are in linear relation with, and spaced increasing distances from, one of the field-creating electrodes, with a third point in linear relation with, and equally spaced from, the other two points, the said third point being spaced from the field-creating electrode that is in linear relation with the points a distance that is a multiple of the spacing between the points, and balancing the current flow between the connected points by changing the resistance of one of the connections, whereby the ratio of the gradients of potential drop between the connected points is established and may be used directly as an ordinate in plotting the curve, and whereby the depth in the earth of which the ratio is representative is accurately controlled by the spacing of the central point from the field-creating electrode.

5. In electrical prospecting by the potential system that includes setting up an electrical field in the ground by means including spaced grounded electrodes and measuring potentials at points in the area to be surveyed, the method of obtaining data for direct plotting in a curve that represents the conductivity of strata in the earth that comprises electrically connecting two respective points on the ground that are in linear relation with, and spaced increasing distances from, one of the field-creating electrodes, with a third point in linear relation with, and equally spaced from the other two points, the said third point being spaced from the field-creating electrode with which the points are in linear relation a distance that is a multiple of the distance between it and the other points, balancing the current flow between the connected points by changing the resistance of one of the connections, and repeating the procedure with a second series of points equally spaced from one another and in linear relation with, and spaced from, the points of the first series, and of which the central point is spaced from the central point of the first series and located between the other two points of the first series, and the said central point of the second series being spaced from the field-creating electrode with which the points are in linear relation a distance that is a multiple of the distance between the said point and the other points of the second series, whereby the ratios of the gradients of potential drop between the connected points of the respective series are obtained and may be used as ordinates, and the spacing between the central points of the respective series may be used as abscissas in plotting the curve.

CARL A. HEILAND.